US011627699B2

(12) United States Patent
Foster et al.

(10) Patent No.: US 11,627,699 B2
(45) Date of Patent: Apr. 18, 2023

(54) MOWER CHUTE GATE CONTROLLER

(71) Applicant: THE TORO COMPANY, Bloomington, MN (US)

(72) Inventors: Robert N. Foster, Batesville, AR (US); Adam W. Branscum, Charlotte, AR (US)

(73) Assignee: THE TORO COMPANY, Bloomington, MN (US)

( * ) Notice: Subject to any disclaimer, the term of this patent is extended or adjusted under 35 U.S.C. 154(b) by 776 days.

(21) Appl. No.: 16/566,294

(22) Filed: Sep. 10, 2019

(65) Prior Publication Data

US 2021/0068342 A1  Mar. 11, 2021

(51) Int. Cl.
*A01D 34/82* (2006.01)
*A01D 34/00* (2006.01)
*A01D 34/71* (2006.01)
*A01D 101/00* (2006.01)

(52) U.S. Cl.
CPC ......... *A01D 34/824* (2013.01); *A01D 34/006* (2013.01); *A01D 34/71* (2013.01); *A01D 2101/00* (2013.01)

(58) Field of Classification Search
CPC .... A01D 34/824; A01D 34/006; A01D 34/71; A01D 2101/00
See application file for complete search history.

(56) References Cited

U.S. PATENT DOCUMENTS

| | | | | |
|---|---|---|---|---|
| 3,243,196 A | * | 3/1966 | Amis | A01D 34/824 280/47.371 |
| 3,646,740 A | * | 3/1972 | Grimes | A01D 75/20 56/320.2 |
| 3,818,687 A | * | 6/1974 | Houst | A01D 34/63 56/255 |
| 3,924,389 A | * | 12/1975 | Kita | B60L 50/16 56/DIG. 15 |
| 4,476,668 A | * | 10/1984 | Reilly | A01D 43/0635 56/16.6 |
| 5,040,364 A | * | 8/1991 | Deegan | A01D 43/0631 56/DIG. 18 |

(Continued)

OTHER PUBLICATIONS www.AdvancedChuteSystem.com.

(Continued)

*Primary Examiner* — Luis A Martinez Borrero
(74) *Attorney, Agent, or Firm* — Mueting Raasch Group

(57) ABSTRACT

An apparatus for mechanically controlling the opening and closing of a gate hingedly mounted at the upper margin of a portal, leveraging the gate from a closed position to either a fully open position or a partially-open resting position. The gate opening function is controlled by a lever-handle actuated gate lifting assembly including a lift leverage bracket carrying a lift actuating rod engageable with a fulcrumatic gate pickup bracket lifting a lifting element of a gate attachment arm providing a hinged connection for the chute gate. The gate closing-catch function is controlled by a pivoting gate stop bracket carried on a second gate attachment arm; the gate stop bracket is biased to have a catch end ridable along an edge of a second riser mount for the second hinged connection for the gate, until the catch end seats or lodges in a closing-catch notch of the second riser mount.

12 Claims, 18 Drawing Sheets

(56) References Cited

U.S. PATENT DOCUMENTS

| | | | | |
|---|---|---|---|---|
| 5,133,175 | A * | 7/1992 | Dumbrell | A01D 34/828 56/320.2 |
| 5,195,311 | A * | 3/1993 | Holland | A01D 34/71 56/320.2 |
| 5,499,494 | A * | 3/1996 | Boshell | A01D 34/71 56/320.1 |
| 5,826,417 | A * | 10/1998 | Evans | A01D 34/828 56/320.2 |
| 5,832,708 | A * | 11/1998 | Sugden | A01D 43/0631 56/16.6 |
| 6,105,350 | A * | 8/2000 | Vachon | A01D 43/077 56/16.6 |
| 6,854,253 | B2 * | 2/2005 | Dickey | A01D 42/005 56/320.2 |
| 6,857,256 | B2 * | 2/2005 | Strange | A01D 43/0635 56/320.2 |
| 6,874,309 | B1 * | 4/2005 | Bellis, Jr. | A01D 42/005 56/320.2 |
| 6,971,224 | B1 * | 12/2005 | Hancock | A01D 34/71 56/255 |
| 7,032,333 | B2 * | 4/2006 | Friberg | E01H 5/045 37/260 |
| 7,448,195 | B2 * | 11/2008 | Kohler | A01D 34/82 56/320.2 |
| 7,574,851 | B1 * | 8/2009 | McLean | A01D 57/20 56/192 |
| 7,594,379 | B2 * | 9/2009 | Nicholson | A01D 34/71 56/320.2 |
| 7,624,562 | B2 * | 12/2009 | Kallevig | A01D 34/71 56/320.2 |
| 7,775,027 | B2 * | 8/2010 | Wang | A01D 34/71 56/320.2 |
| 8,104,255 | B1 * | 1/2012 | Hurst | A01D 34/71 56/220 |
| 9,226,445 | B2 * | 1/2016 | DeHart | A01D 34/71 |
| 9,277,689 | B2 * | 3/2016 | Luking | A01D 34/71 |
| 9,986,683 | B2 * | 6/2018 | Zhang | A01D 34/824 |
| 10,729,069 | B2 * | 8/2020 | Condon | A01D 34/71 |
| 10,791,672 | B2 * | 10/2020 | Berglund | A01D 34/71 |
| 10,897,845 | B2 * | 1/2021 | Walker | A01D 34/71 |
| 11,096,326 | B2 * | 8/2021 | Bejcek | A01D 43/08 |
| 2004/0083702 | A1 * | 5/2004 | Strange | A01D 43/0635 56/320.2 |
| 2004/0128970 | A1 * | 7/2004 | Gazlay | A01D 34/71 56/320.2 |
| 2006/0037299 | A1 * | 2/2006 | Kallevig | A01D 34/82 56/15.7 |
| 2007/0261380 | A1 * | 11/2007 | Bledsoe | A01D 42/005 56/320.2 |
| 2008/0134654 | A1 * | 6/2008 | Kohler | A01D 34/71 56/320.2 |
| 2009/0031689 | A1 * | 2/2009 | Nicholson | A01D 34/71 56/320.2 |
| 2015/0237800 | A1 * | 8/2015 | DeHart | A01D 34/71 56/202 |
| 2015/0359169 | A1 * | 12/2015 | Weems | A01D 34/76 56/14.7 |
| 2018/0255708 | A1 * | 9/2018 | Berglund | A01D 43/077 |
| 2018/0368313 | A1 * | 12/2018 | Kaskawitz | A01D 34/18 |
| 2019/0075723 | A1 * | 3/2019 | Spitz | A01D 34/71 |
| 2019/0082592 | A1 * | 3/2019 | Berglund | A01D 34/71 |
| 2019/0261563 | A1 * | 8/2019 | Condon | A01D 34/006 |
| 2019/0346261 | A1 * | 11/2019 | Carson | G01B 21/30 |
| 2020/0205338 | A1 * | 7/2020 | Zeiler | A01D 34/71 |
| 2020/0214201 | A1 * | 7/2020 | Bejcek | A01D 43/08 |
| 2020/0323130 | A1 * | 10/2020 | Shaffer | A01D 34/005 |
| 2020/0359561 | A1 * | 11/2020 | Duregger | A01D 43/063 |
| 2021/0274711 | A1 * | 9/2021 | Henry | A01D 42/005 |

OTHER PUBLICATIONS

Bad Boy Mowers, Commercial & Residential Zero Turn Mowers; Web page: www.BadBoyMowers.com; believed available as early as 2002; Retrieved from the Internet Archive Wayback Machine: web.archive.org/web/20190924152825/https://www.badboymowers.com/ on Sep. 8, 2022. 10 pages.

"The Qwikchute Advantage" GTM Manufacturing Inc., Web page: www.qwikchute.com, 1 page, believed available as early as 2003; Retrieved from the Internet Archive Wayback Machine: web.archive.org/web/20190801162801/http://qwikchute.com/ on Sep. 8, 2022; 2 pages.

Screen captures from YouTube video clip entitled "DLC—How To Install The 'Advanced Chute System,'" uploaded to YouTube on Aug. 8, 2017 by user "HandyGuy 2016"; Screenshots from minutes 2:10, 1:55, and 10:45 retrieved on Sep. 8, 2022 from the Internet: www.youtube.com/watch?v=8NvWNFurE3E. 3 pages.

* cited by examiner

MOWER CHUTE GATE CONTROLLER

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION

1. Field of the Invention

The present disclosure relates to the field of chute door controllers. More particularly, the invention disclosed herein relates to mechanisms controlling the opening and closing of a door or gate covering a lawn mower chute, preferably on a riding mower, although the controller may be applied to other passageways as well.

2. Background of Invention

Many riding mowers have one or more rotating mower blades that expel clippings from beneath the mower after cutting. Sometimes it is advantageous that the chute opening be completely closed, whereas it is advantageous at other times that the chute opening be unobstructed; there are also times when it is advantageous for the chute opening to be partially open.

Known in the field are the following.

U.S. Pat. No. 6,854,253 issued to Dickey discloses a mower discharge door operating mechanism including 3 pivoting arms linked in series to convert forward movement of a lever handle into a horizontal force that pulls the top end of a vertical extension of a top-hinged door, to open it. Included are the lever handle linked to a $1^{st}$ L-shaped member's incoming crank-arm, which pivots at the L-angle and moves the $1^{st}$ L-shaped member's outgoing crank-arm, which is linked to a $2^{nd}$ L-shape member's incoming crank-arm, which pivots at the L-angle and moves the $2^{nd}$ L-shape member's outgoing crank-arm, which links to a vertical riser-arm co-planar beside the top-hinged chute door. The last pivot of the $2^{nd}$ L-shaped member essentially pulls the top of the riser-arm away from the chute door and leverages it open.

U.S. Pat. No. 6,857,256 issued to Strange discloses a lawn mower chute opening apparatus that converts lever handle movement parallel to the chute opening into raising and lowering force perpendicular thereto. Included are a lever handle attached to one end of a rotatable pivot bar supporting (perpendicular thereto) one end of a pivot arm having a cam plate on its opposite end; lever handle movement rotates the pivot bar, which raises the pivot arm and causes the cam plate to raise a lift plate affixed to the chute door. On the other side of the chute door, an extension spring extends between the chute housing and a plate affixed to the chute door, so that it biases the door closed when it is closed, and it biases the door open after the door has been opened enough to pass an apex point for the spring tensioning.

U.S. Pat. No. 7,448,195 issued to Kohler discloses a lawn mower attachment for controlling discharge flow, including a notched control rod having a ball and socket coupling to a pin linked to an end bracket extending from the chute door. Pulling upward on the control rod causes the pin to lift the end bracket on the door, so that the door pivots upwardly. By extending the control rod through a bracket having connected holes of different sizes, the amount of door opening can be fixed by moving the control rod into the smaller hole at a notch.

Bad Boy, Inc. in Batesville, Ark. (BadBoyMowers.com) manufactures a chute door controlling mechanism called Advanced Chute System (AdvancedChuteSystem.com) that is superficially similar to the invention disclosed herein. However, the chute door is linked directly to that leverage mechanism, which (unlike the disclosed invention) can become damaged if the chute door is opened by pulling or pushing force other than that applied by that leverage mechanism. Moreover, that leverage mechanism is actuated by movement perpendicular to the user rather than forward/backward movement (beside the user) actuating the leverage mechanism of the disclosed invention.

GTM Manufacturing in Groveland, Fla. (QwikChute.com) manufactures a chute door controlling mechanism that, at first blush, appears to function in a manner similar to the invention disclosed herein. Perhaps the feature that most distinguishes the invention disclosed herein and the QwikChute mechanism is the door partially-open function of the invention disclosed herein; the QwikChute mechanism has no such functionality, which has great utility and benefit in mulching and in circumstances wherein it is important or advantageous to allow partial opening of the gate.

None of the other chute gate control mechanisms disclosed herein is as simple and direct as the manually operated mechanism of the invention disclosed herein, while maintaining the forward/backward actuation. Moreover, none of the other mechanisms disclosed here include a triple-action extension spring functioning to bias the chute gate closed when needed, and to bias it open when needed, or to bias the chute gate in the partially-open position when needed. Furthermore, none of the other mechanisms disclosed herein includes a gate-lifting mechanical linkage that is disconnected from the gate, allowing the gate to be pushed or pulled opened in a manner that will not exert force or stress upon the mechanical linkage that may damage the linkage.

BRIEF SUMMARY OF THE INVENTION

The invention is essentially a controller mechanism mounted to the chute of a mower deck of a lawnmower, providing mechanical linkage for opening and closing the chute gate. It is actuated by the movement of a lever handle, easily within grasp of the user. Ideally a short movement of the lever handle, beside the user and moving in a forward/rearward orientation (rather than across the lap of the user), is sufficient to fully open the chute gate, which is closed in the resting position. Preferably the lever handle can be used to alternatively raise the gate to a fully open position or to a partially-open position; spring biasing is sufficient to maintain the chute gate in the desired closed, open or partially-open position.

In general, the invention is essentially a leverage mechanism controlling the 180-degree opening and closing of a gate covering the mouth of a mower chute, by a short movement of a lever handle, and with an intermediate gate-partially-open position. In one embodiment, there is a top-hinged gate mounted to the upper edge of the chute opening by the gate attachment arm(s), said hinge including a gate pickup bracket (on the side of the hinge away from the swing of the gate) accepting downward force to fulcrumatically leverage the gate upwardly for opening. There is an upstanding lever handle anchored to one end of a lift leverage bracket hingedly attached to the top of the mower chute; the lever handle end may be attached to the lift leverage bracket either near the hinged end of the lift leverage bracket or near the non-hinged end. Movement of the leverage handle toward the front of the mower, away from the gate-closed position, depresses the non-hinged end of the lift leverage bracket carrying a lift actuating rod linked to the gate pickup bracket, thereby leveraging the gate upwardly for opening.

As shown in the representative example depicted in FIG. 2, the lift leverage bracket (10) includes a lift actuating rod (20) having a ball-jointed (22) (pivoting) anchoring end and a ball-jointed (24) (pivoting) gate actuating end; the first ball joint (22) closest to the hinged end of the lift leverage bracket is pivotally anchored to the lift leverage bracket. From there, the lift actuating rod (20) extends through (and is constrained by) a window frame aperture (14) within the opposite (non-hinged) end of the lift leverage bracket (10). The second ball-joint (24) provides a gate actuating end for the lift actuating rod, and is affixed to the gate depression end (44) of the pickup bracket (42) on the inward side of the gate hinge; moving the handle forward depresses the non-hinged end of the lift leverage bracket, and causes the lift leverage bracket to force the lift actuating rod downwardly against the depression end (44) of the gate pickup bracket (42), which arcs downwardly around and behind the hinge to fulcrumatically leverage a gate attachment arm (and attached gate) upwardly on the outward side of the hinge. Preferably, ball joints are used on both ends of the lift actuating rod, to allow movement of the rod in multiple directions as necessary, since depressing of the depression end of the gate lifting assembly is accomplished with arcing motion. The configuration of the rod and ball joints allows enables adjustment, to cure misalignment of that portion of the controlling mechanism.

Besides the gate opening mechanism just described, the controller may also include a gate closing-catch assembly, to control the closing of the gate. It may include a second hinged connection with the chute gate, involving a second riser mount (51) having an upper end defining an aperture accepting a second hinge pin (59), and having an outer edge facing outwardly towards the gate. The second hinged connection with the chute gate may also support a second gate attachment arm (57) attached to the chute gate, capable of arcing rotation around the second hinge connection during gate opening and closing. The second gate attachment arm may also have a gate stop bracket (60) fulcrumatically connected thereto, being carried along the arcing path of the second attachment arm around the second hinged connection; the gate stop bracket may also include a counterbalance end (62) and, on the opposite side of the fulcrumatic connection, a catch end abutting the outer edge of the second riser mount (51). The outer edge of the second riser mount may also include a closing-catch notch (52) for accepting a portion of the catch end of the gate stop bracket (60), such as a converging tip (64). The seating or lodging of the catch end of the gate stop bracket in the closing-catch notch of the second riser mount essentially chocks the gate in a partially-open position.

The closing-catch assembly further may include an extension spring (71) having one end anchored to a lower portion of the second riser mount, and an opposite end connected to the second gate attachment arm (57) and biasing it in a gate-closed position. Movement of the leverage handle (32) only partly away from the gate-closed position opens the gate only partially, which causes an arcing rotation of the second gate attachment arm (57) around the second hinge connection with the second riser mount, while the gate stop bracket (60), fulcrumatically connected to the second gate attachment arm (57), maintains its gate-closed orientation with its counterbalance end (62) biased outwardly and its catch end traveling along the outer edge of the second riser mount until its tip (64) seats in the closing-catch notch (52) of the outer edge of the second riser mount to thereby chock the gate in a partially-open position. Since the arcing rotation separates the ends of the extension spring (71), it more forcefully biases the chocked chute gate in the partially-open position.

Further subsequent movement of the leverage handle away from the gate-closed position moves the tip of the gate stop bracket out of the closing-catch notch. Continued movement of the leverage handle causes the outer edge of the second riser mount to leverage the gate stop bracket to pivot so that its counterbalance end (62) pivots inwardly and biases the tip (64) outwardly away from seating in the closing-catch notch (52). Maximum movement of the leverage handle forward causes sufficient arcing rotation of the second gate attachment arm around the second hinge connection with the second riser mount, so that the upper end of the extension spring travels to the opposite side of that second hinged connection, and biases the chute gate in the open position. The counterbalance end (62) also biases the gate stop bracket's tip (64) outwardly away from seating in the closing-catch notch (52). Subsequent movement of the lever handle toward the gate-closed position, either from the gate open position or after unchocking the tip (64) from the closing-catch notch (52) in the partially-open position, reverses the rotation of the second gate attachment arm around the second hinge connection of the second riser mount. This allows the tip (64) of the gate stop bracket (60) to bypass the closing-catch notch (52) while the gate closing-catch assembly returns to its initial gate-closed configuration with the gate stop bracket fulcrumatically pivoted back so that its counterbalance end (62) is again biased outwardly and its catch end is again abutting the outer edge of the second riser mount; the extension spring (71) also biases the chute gate in the gate closed position.

DETAILED DESCRIPTION OF THE INVENTION

Figure 1:
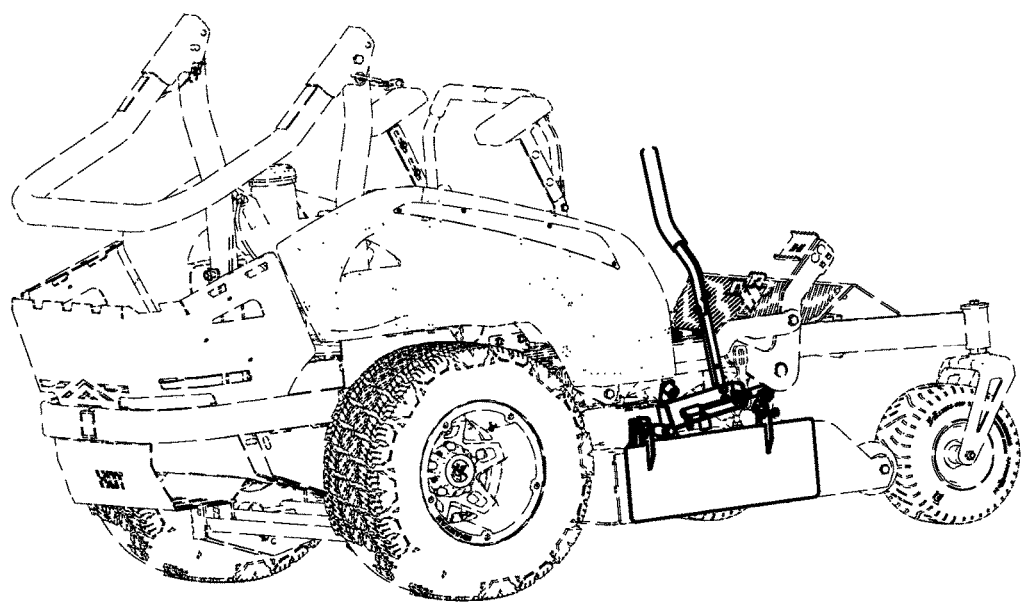
FIG. 1 depicts a rear perspective view of a representative sample of mower (in phantom) with a chute with a gate, and having an actuation mechanism of the present invention for controlling the opening, closing and partial opening of the chute gate.
Figure 2:
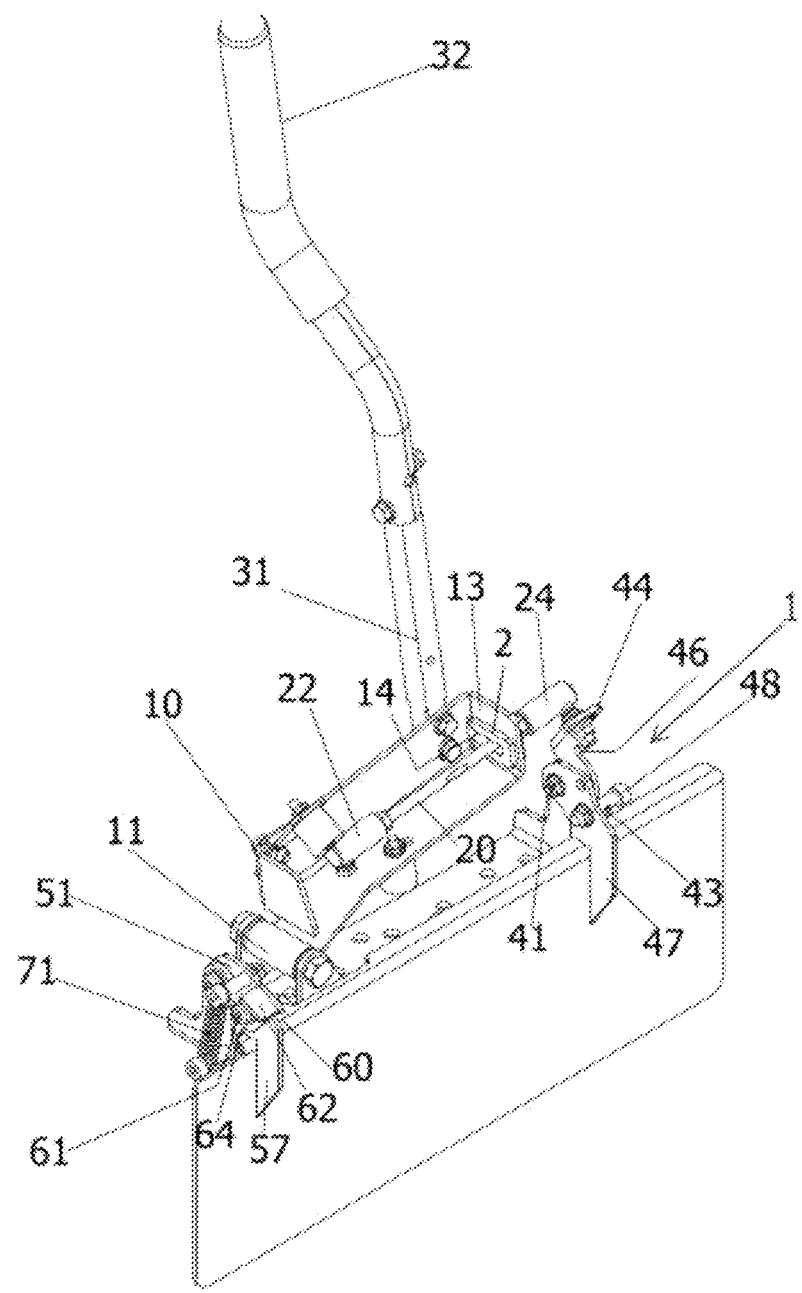
FIG. 2 depicts a close-up view of FIG. 1, with the phantom portion of the mower removed, and with the chute gate and its actuation mechanism in the closed configuration.
Figure 3:
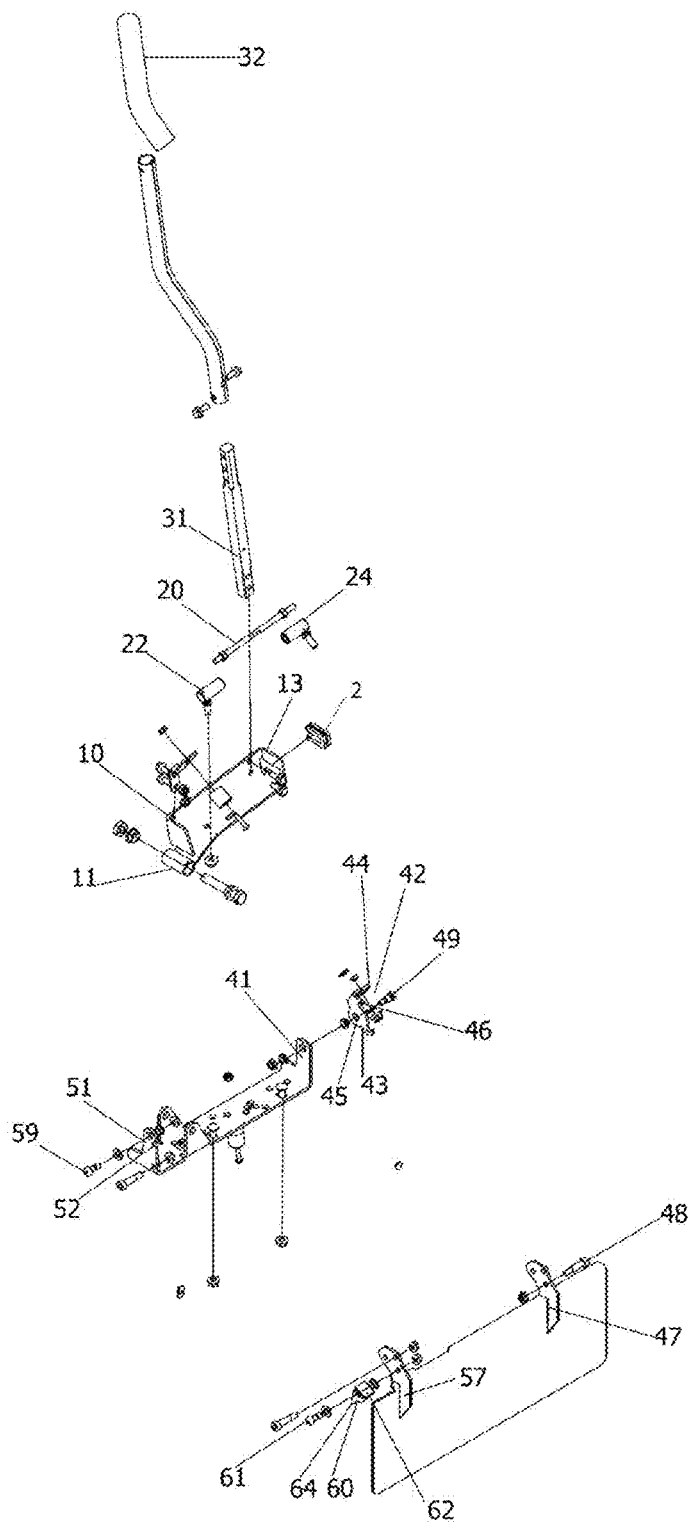
FIG. 3 depicts a partially exploded view of FIG. 2.
Figure 4:
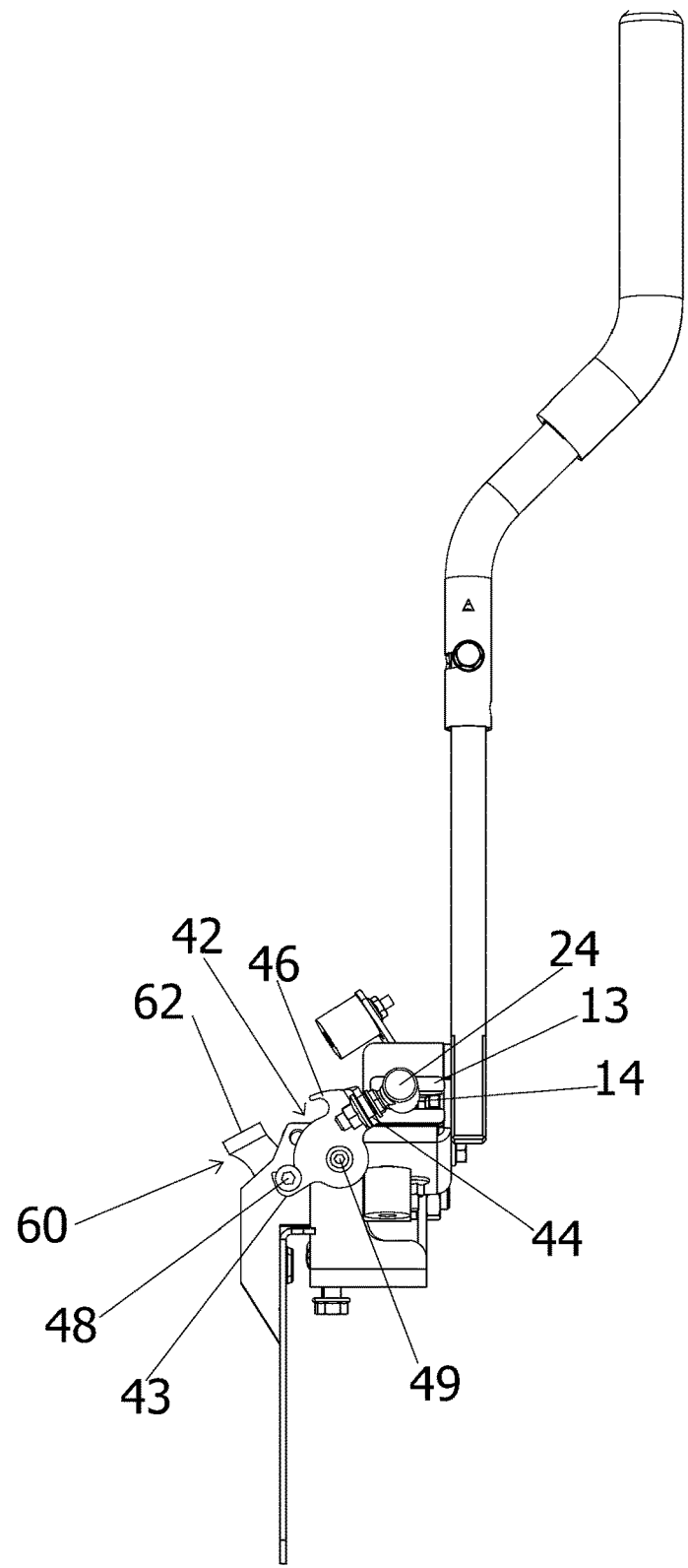
FIG. 4 depicts an elevation view of FIG. 2, from the front of the mower.
Figure 5:
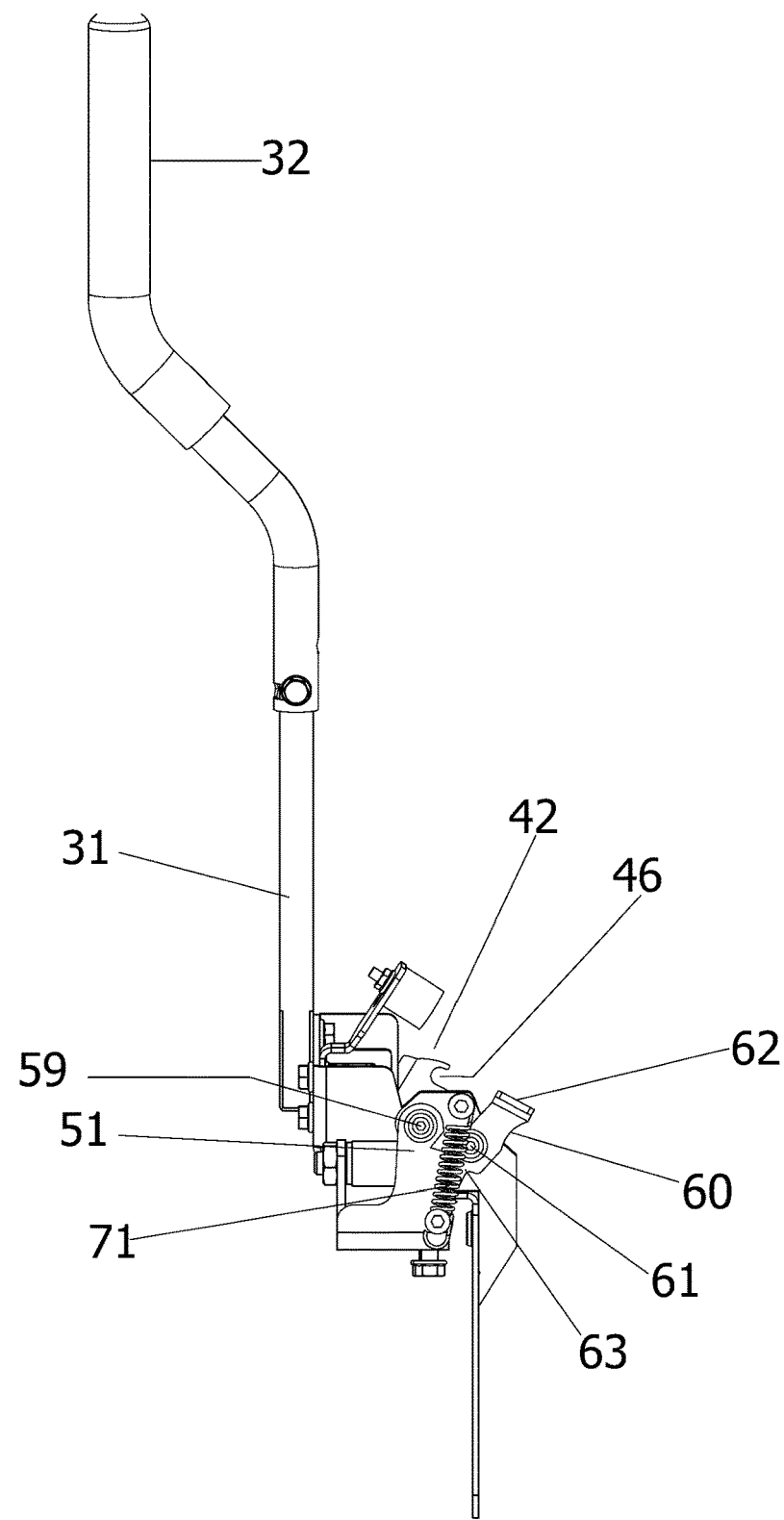
FIG. 5 depicts an elevation view of FIG. 2, from the rear of the mower.
Figure 6:
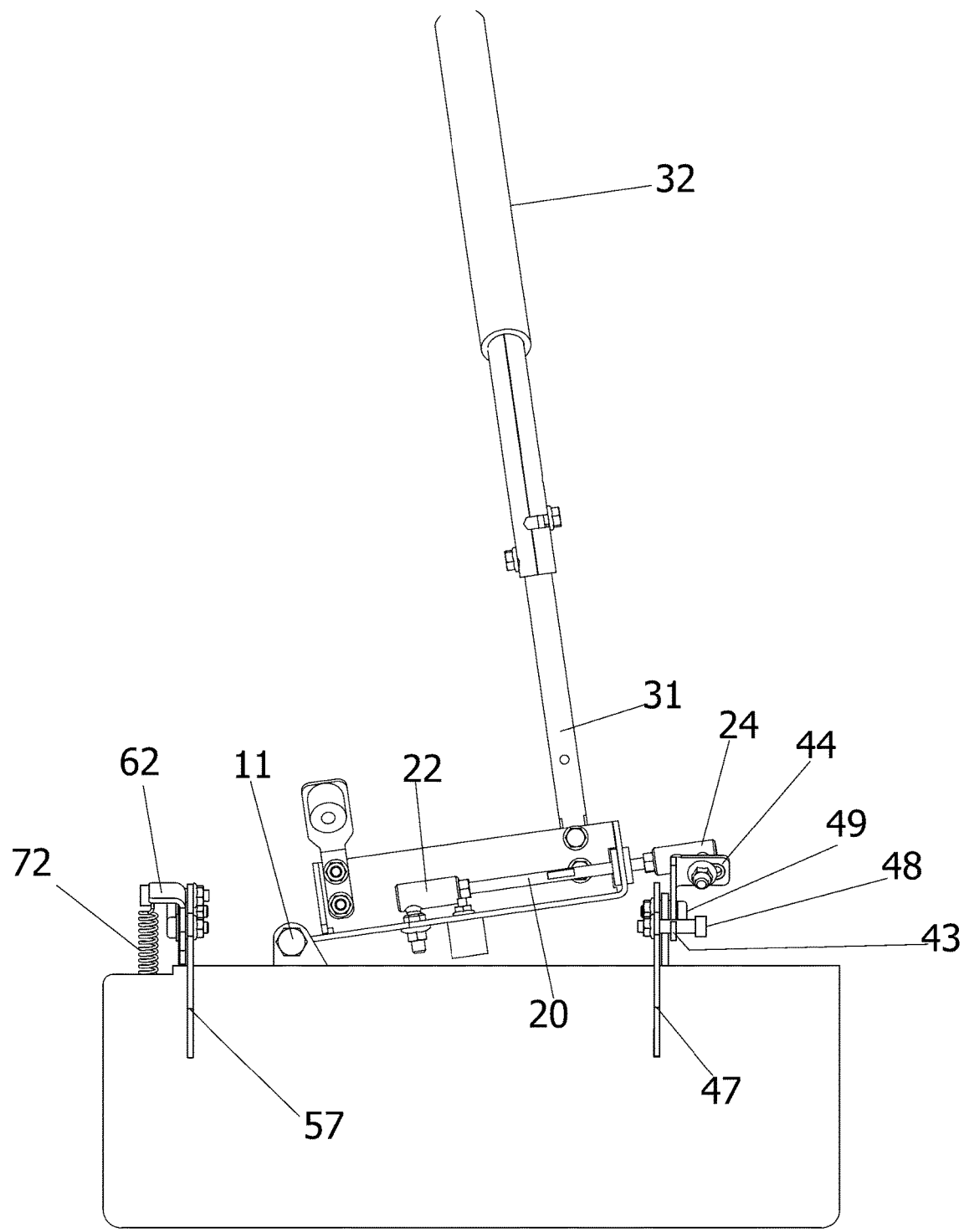
FIG. 6 depicts an elevation view of FIG. 2, from the chute side of the mower.
Figure 7:
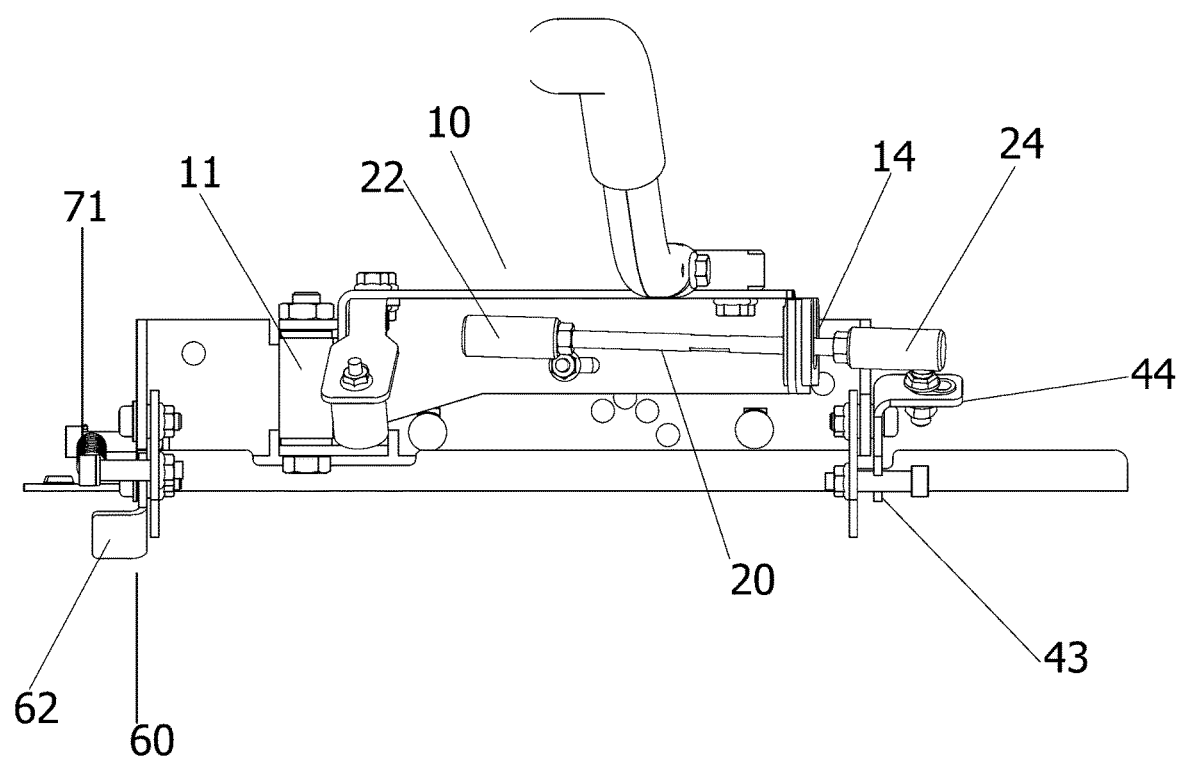
FIG. 7 depicts a top plan view of FIG. 2.
Figure 8:
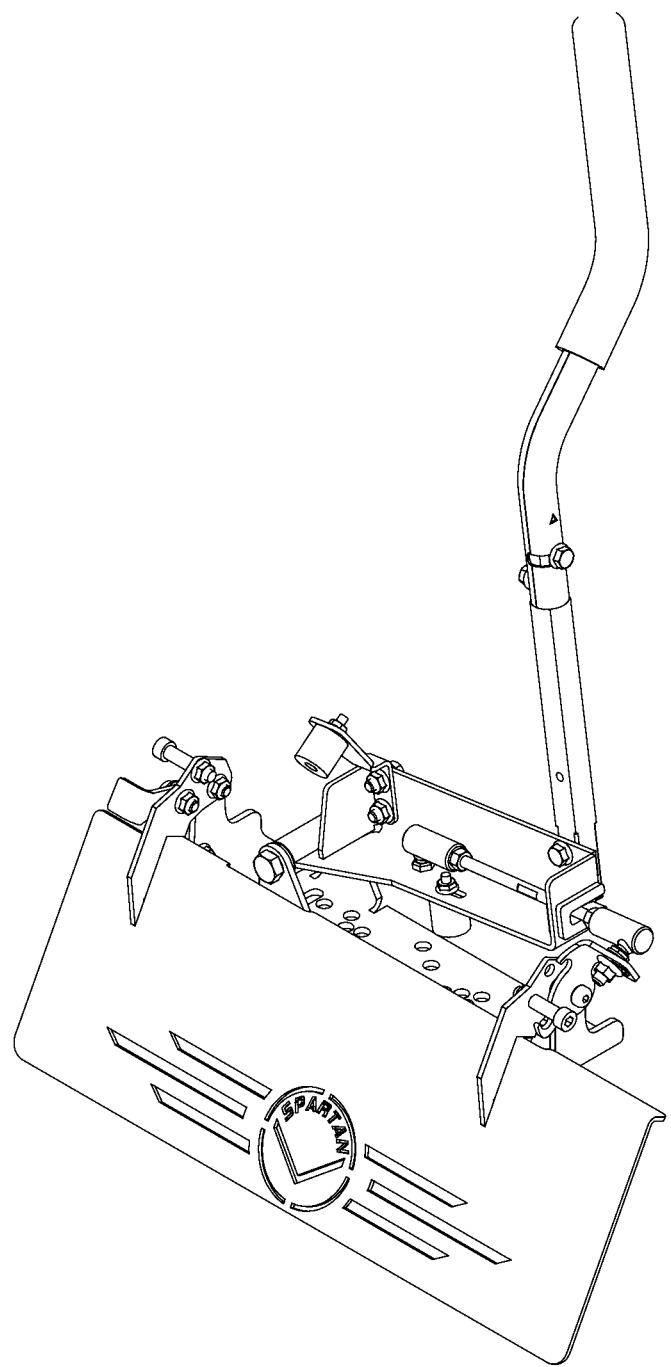
FIG. 8 depicts a close-up perspective view of the gate and its actuation mechanism of FIG. 2, but with the gate in a partially-open resting configuration.
Figure 9:
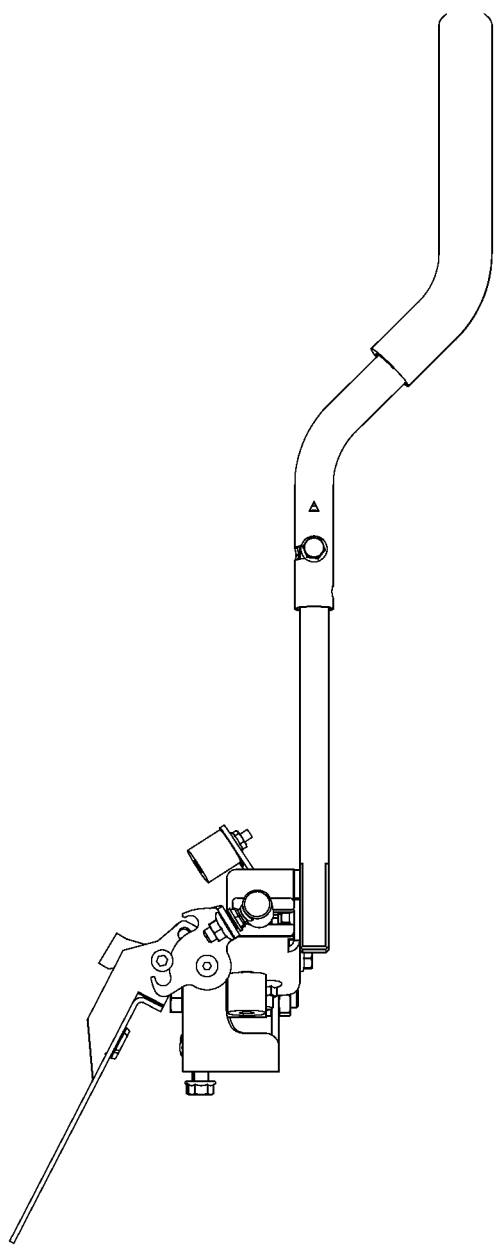
FIG. 9 depicts an elevation view of FIG. 8, from the front of the mower.
Figure 10:
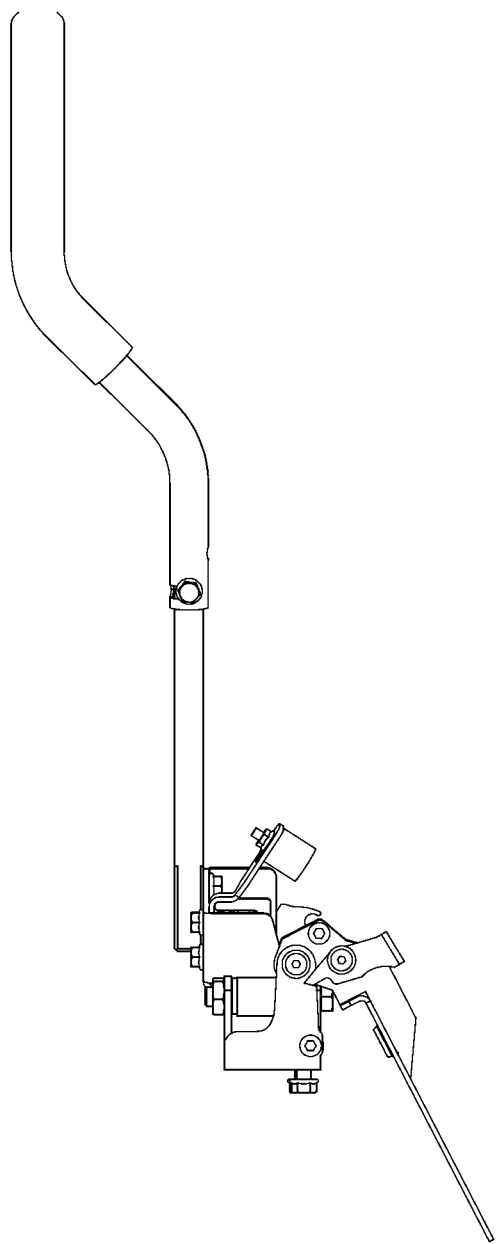
FIG. 10 depicts an elevation view of FIG. 8, from the rear of the mower, and with the extension spring removed to reveal the converging tip of the catch end of the gate stop bracket seated in the closing-catch notch of the second riser mount.
Figure 11:
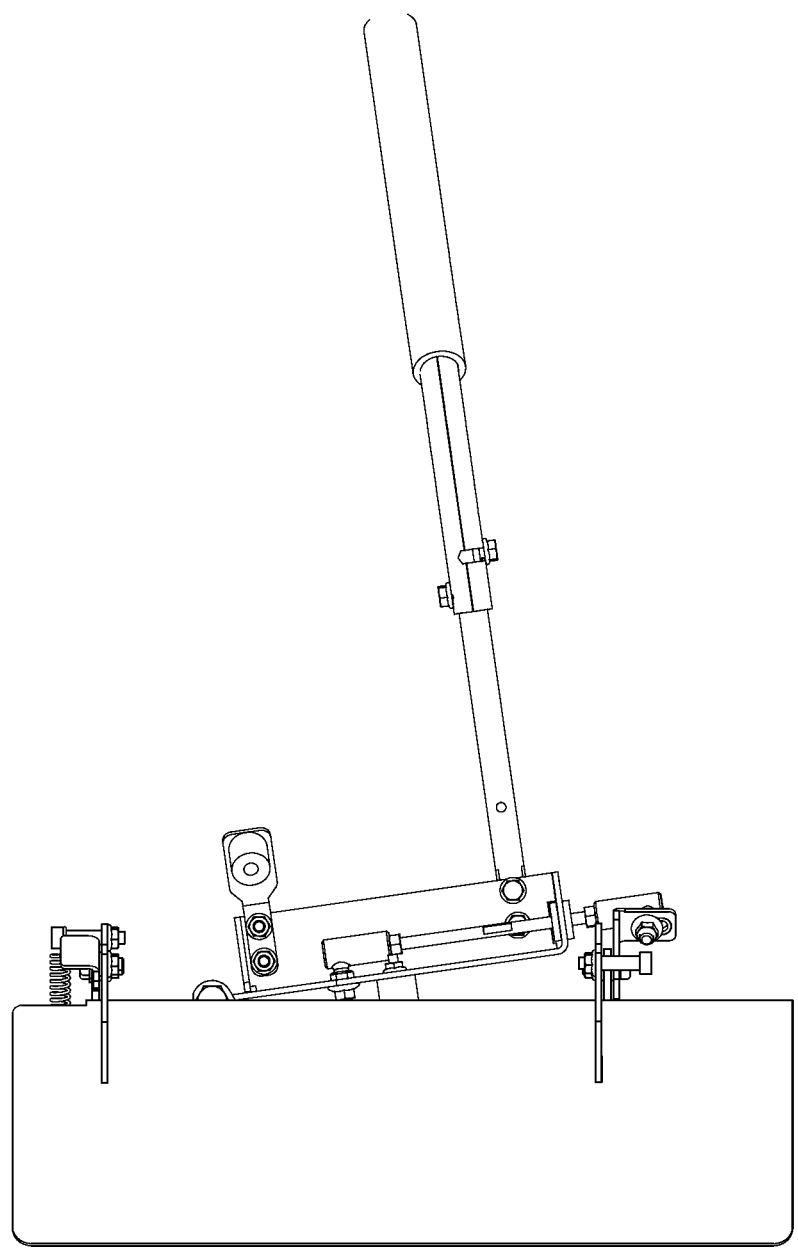
FIG. 11 depicts a elevation view of FIG. 8, from the chute side of the mower.
Figure 12:
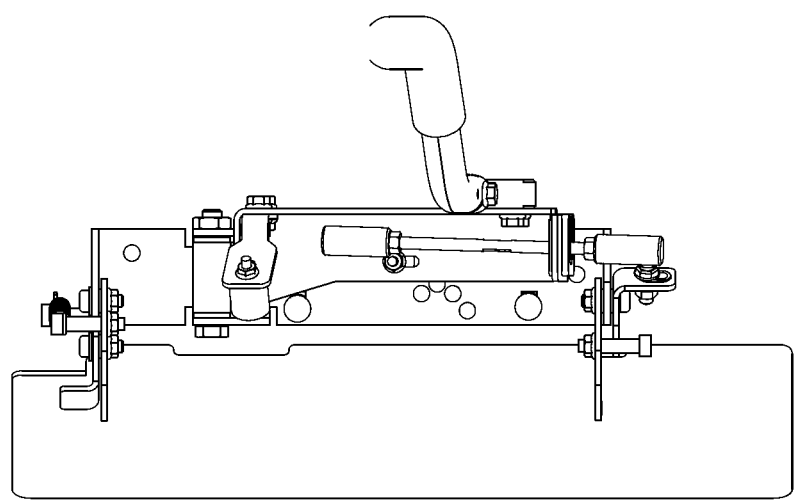
FIG. 12 depicts a top plan view of FIG. 8.
Figure 13:
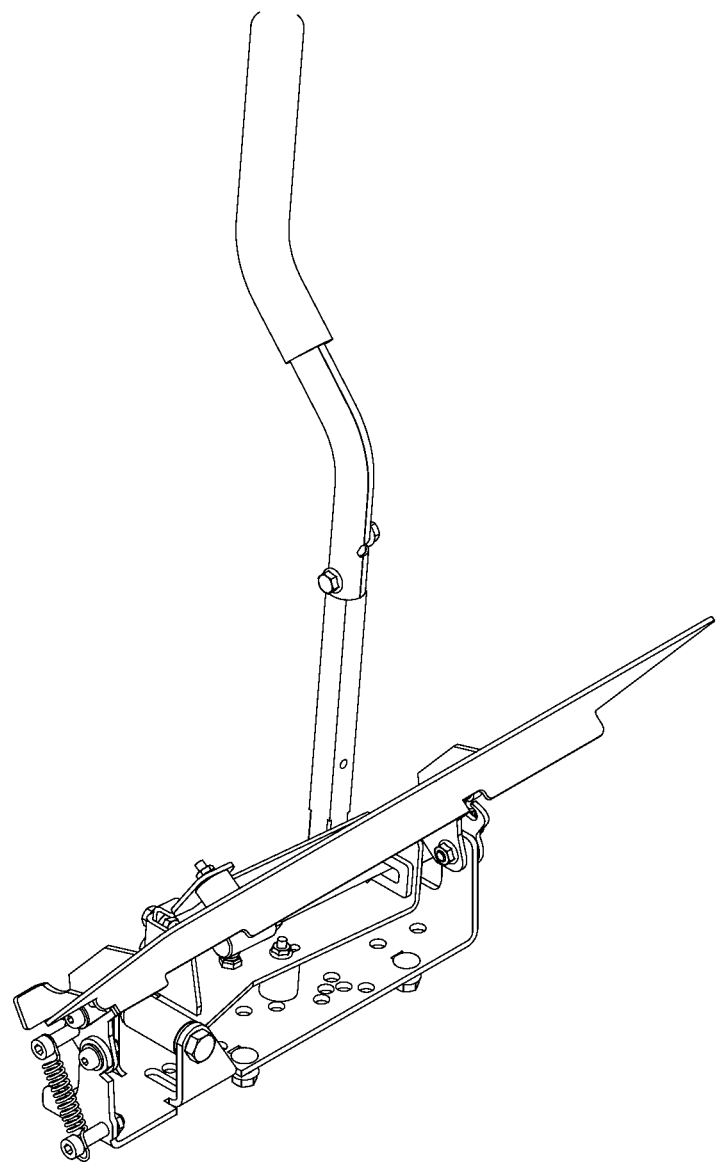
FIG. 13 depicts a close-up perspective view of the gate and actuation mechanism of FIG. 2, but with the gate and its actuation mechanism in a fully open configuration.
Figure 14:
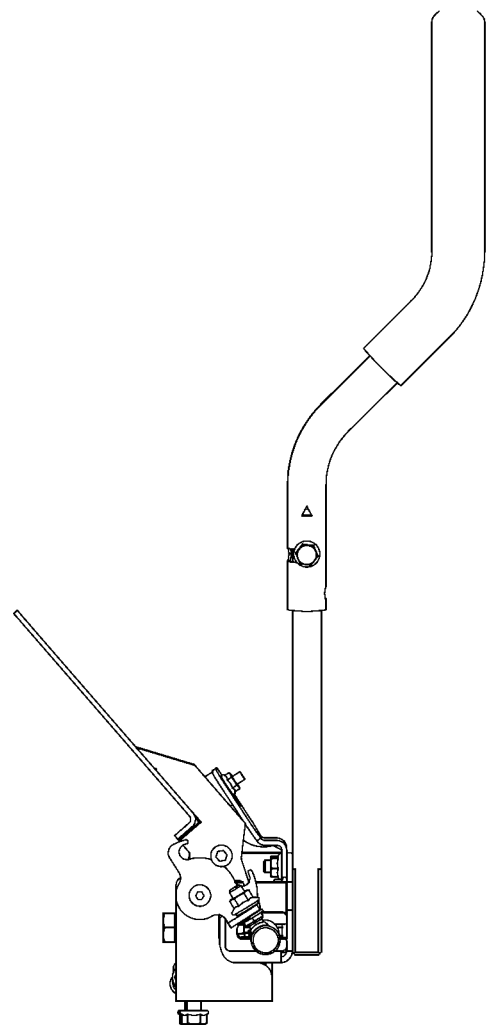
FIG. 14 depicts an elevation view of FIG. 13, from the front of the mower.
Figure 15:
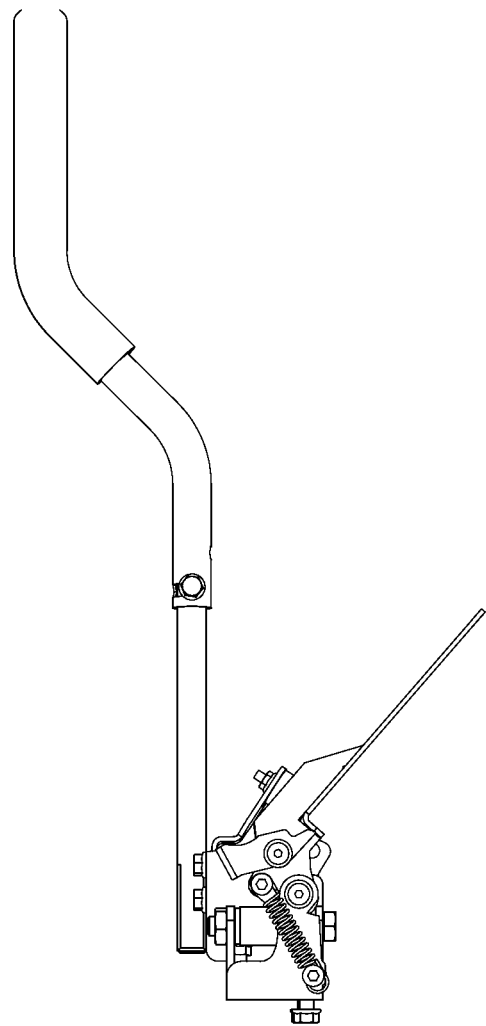
FIG. 15 depicts an elevation view of FIG. 13, from the rear of the mower.
Figure 16:
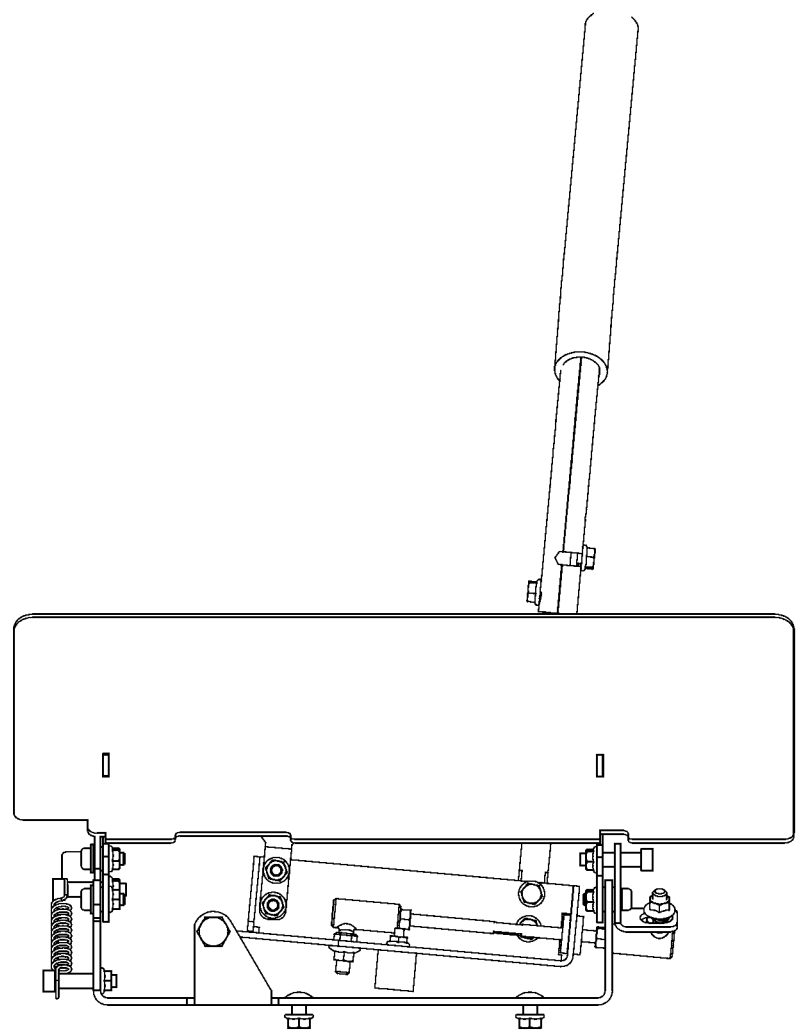
FIG. 16 depicts an elevation view of FIG. 13, from the side of the mower.
Figure 17:
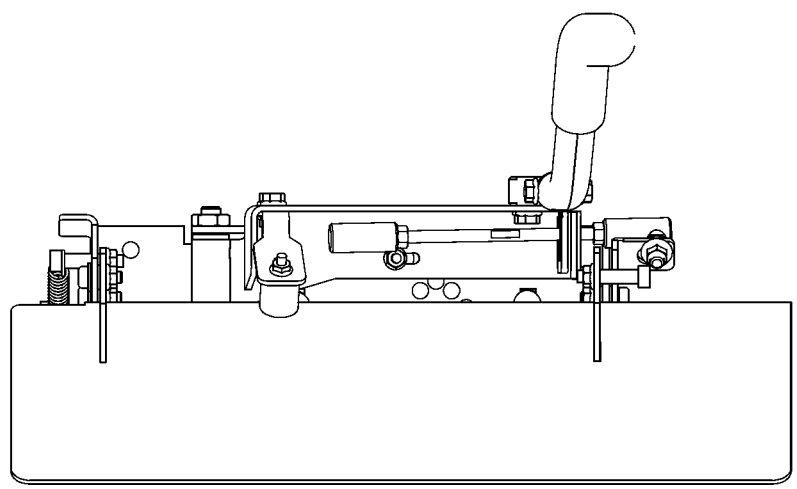
FIG. 17 depicts a top plan view of FIG. 13.
Figure 18:
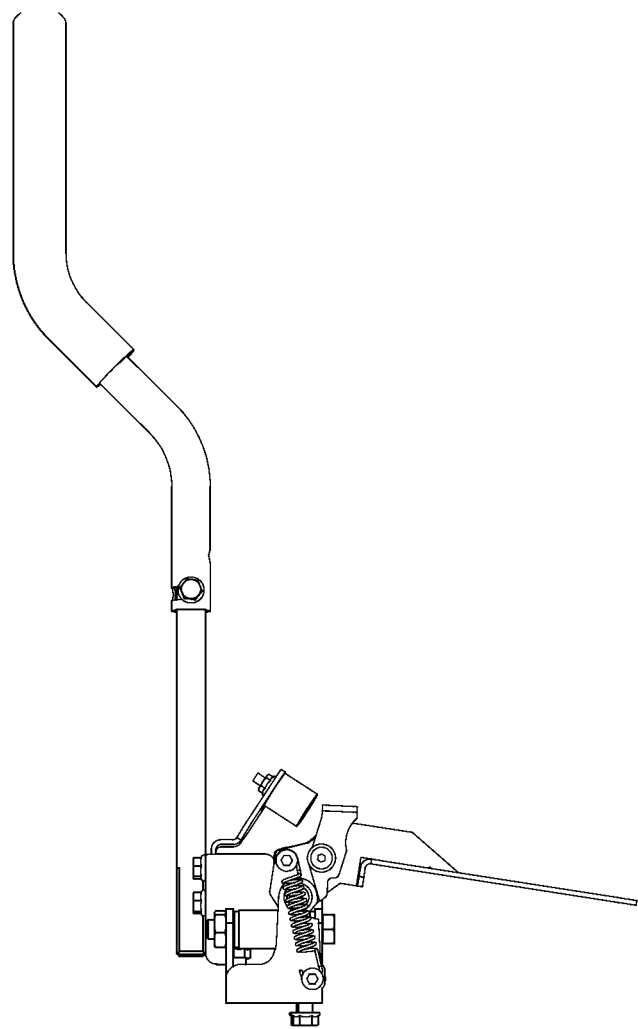
FIG. 18 depicts an elevation view of the gate and actuation mechanism of FIG. 8, but with the gate and its actuation mechanism immediately after initiation of closing.

The terminology used herein is for the purpose of describing particular embodiments only, and is not intended to be limiting. As used herein, the singular forms "a", "an", and "the" are intended to include the plural forms as well, unless the context clearly indicates otherwise. It will be further understood that the terms "comprising", "including" or "having", or any derivative thereof, when used in this specification, specify the presence of stated features, regions, integers, steps, operations, elements, and/or components, but do not preclude the presence or addition of one or more other features, regions, integers, steps, operations, elements, components, and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element.

The disclosure herein is not limited by construction material(s) to the extent that such materials satisfy the structural and/or functional requirements. For example, any material may be used so long as it satisfies the rigid and/or durable structural and functional requirements for which it is being used.

Any extension spring or similarly functioning structure may be used that accomplishes the desired amount of biasing or assistance in gate opening and closing.

It is an object of the present invention to provide a mechanism for mechanically controlling the opening and closing of a mower chute gate that can be accomplished without detriment to the control of the mower, such as (for example) by a mechanism actuated by forward/rearward movement of the lever beside the user rather than perpendicular movement.

Another object of the invention is to provide a mechanism for controlling the opening and closing of a mower chute gate that allows a partially-closed chute for mulching or other purposes.

Another object of the invention is to provide a mechanism for controlling the opening and closing of a mower chute gate that is simple, and to provide a control mechanism that is durable and less prone to breakage (such as, for example, preventing damage to the control mechanism if the gate is pushed or pulled open by forces other than the control mechanism).

Another object of the invention is to provide a mechanism for controlling the opening and closing of a mower chute gate that requires little motion or coordination.

Another object of the invention is to provide a mechanism for controlling the opening and closing of a mower chute gate that is easily operated from the operator's position.

Other objects of the invention will become clear upon a review of the disclosure herein.

One general embodiment of the invention disclosed herein comprises (includes) an apparatus for controlling the opening and closing of a gate hingedly mounted at the upper margin of a portal, wherein the apparatus may include a gate lifting assembly (1) which may include a first hinge pin (49) hingedly connecting, to a riser mount (41), a gate attachment arm (47) having a lift projection and a gate pickup bracket having a depression end and a lifting end on opposite sides of that hinge pin providing a fulcrumatic connection. Also included is a lift leverage bracket which may include a hinged end hingedly anchored near the portal, and having a second end near the depression end of the gate pickup bracket. It further may include a tethering means for constraining a lift actuating rod carried by the lift leverage bracket. The lift actuating rod may include a pivotal anchoring end anchored to the lift leverage bracket close to the hinged end, and extending through and constrained by the tethering means; it may also include a depressing end affixed to the depression end of the gate pickup bracket. The apparatus may also include a leverage handle having an anchor end anchored to the lift leverage bracket near the hinged end, and having a handle end to be grasped for actuating the apparatus; movement of the leverage handle from a gate-closed position causes the lift leverage bracket to pivot so that the depressing end of the lift actuating rod depresses the depression end of the gate pickup bracket, which fulcrumatically leverages the lifting end upwardly beneath the lift projection (48) of the gate attachment arm, thereby lifting the gate.

The apparatus may also include the depressing end adapted for pivoting connection to the leverage end. For example, the adaptation for pivoting connection to the leverage end may include a ball joint. The pivotal anchoring end of the rod may likewise include a ball joint.

The tethering means constraining the lift actuating rod carried by the lift leverage bracket may include a second end wall (13) defining an aperture (14). For example, the second end wall may accept the mounting of a guide bushing (2) while the lift actuating rod extends out past the second end wall, the guide bushing effectively preventing complete escape of the lift actuating rod. The guide bushing may be made of neoprene or similar material allowing the rod to move with little friction.

The gate pickup bracket further may include an outer edge facing outwardly towards the gate; an opening-stop notch may be formed in that outer edge, interfaceable with the lift projection of the attachment arm to stop further opening of the gate.

Subsequent movement of the lever handle back toward the gate-closed position reverses the lift leverage bracket's pivoting depressing of the depression end of the gate pickup bracket, thereby lowering the lifting end beneath the lift projection of the gate attachment arm and thereby allowing the gate to return to its initial gate-closed position.

A more detailed embodiment of the controller may further include a gate closing-catch assembly, to control the closing of the gate. It may include a second hinge pin (59) hingedly connecting:

(a) a second riser mount (51) having an upper end defining an aperture accepting the second hinge pin, and having an outer edge facing outwardly towards the gate and including a closing-catch notch; and (b) a second gate attachment arm having a gate stop bracket fulcrumatically connected thereto and including a counterbalance end and on the opposite side of the fulcrumatic connection a catch end abutting the outer edge of the second riser mount and having a tip for seating in the notch.

The closing-catch assembly further may include an extension spring having one end anchored to a lower portion of the second riser mount, and an opposite end connected to the second gate attachment arm and biasing it in a gate-closed position. Movement of the leverage handle only slightly away from the gate-closed position opens the gate only slightly, which causes an arcing rotation of the second gate attachment arm around the second hinge connection with the second riser mount while the gate stop bracket maintains its gate-closed orientation with its counterbalance end biased outwardly and its catch end traveling along the outer edge of the second riser mount until its tip seats in the closing-catch notch of the outer edge of the second riser mount to thereby chock the gate in a partially-open position.

Further subsequent movement of the leverage handle away from the gate-closed position moves the tip of the gate stop bracket out of the closing-catch notch. Continued movement of the leverage handle causes the outer edge of the second riser mount to leverage the gate stop bracket to pivot so that its counterbalance end pivots inwardly and biases the tip outwardly away from seating in the closing-catch notch, so that subsequent movement of the lever handle toward the gate-closed position reverses the rotation of the second gate attachment arm around the second hinge connection of the second riser. This allows the tip of the gate stop bracket to bypass the closing-catch notch while the gate closing-catch assembly returns to its initial gate-closed configuration with the gate stop bracket fulcrumatically pivoted back so that its counterbalance end is biased outwardly and its catch end is again abutting the outer edge of the second riser mount; the extension spring may also bias it in the gate-closed position.

One specific embodiment of the controller comprises (includes) an apparatus for controlling the opening and closing of a gate hingedly mounted at the upper margin of a chute mouth of a mower deck, with the apparatus including:

(a) a gate lifting assembly may include a first hinge pin (49) hingedly connecting, to a riser mount, a gate attachment arm having a lift projection and a gate pickup bracket having a depression end and a lifting end;

(b) a gate closing-catch assembly may include a second hinge pin (59) hingedly connecting:

(1) a second riser mount having an upper end defining a hole accepting the second hinge pin, and having an outer edge facing outwardly towards the gate and including a closing-catch notch; and (2) a second gate attachment arm having a gate stop bracket fulcrumatically connected thereto and including a counterbalance end and on the opposite side of the fulcrumatic connection a catch end abutting the outer edge of the second riser mount and having a tip for seating in the notch;

(c) a lift leverage bracket may include a hinged end hingedly anchored near the chute mouth and having a second end near the depression end of the gate pickup bracket, and further may include a tethering means for constraining a lift actuating rod carried by the lift leverage bracket, the lift actuating rod may include a pivotal anchoring end having a ball joint anchored to the lift leverage bracket close to the hinged end and extending through and constrained by the tethering means, and may include a depressing end having a ball joint affixed to the depression end of the gate pickup bracket; and (d) a leverage handle having an anchor end anchored to the lift leverage bracket near the hinged end, and having a handle end to be grasped for actuating the apparatus, whereby movement of the leverage handle from a gate-closed position causes the lift leverage bracket to pivot so that the lift actuating rod depresses the depression end of the gate pickup bracket, which fulcrumatically leverages the lifting end upwardly beneath the lift projection of the gate attachment arm, thereby raising the gate.

Movement of the leverage handle the maximum distance from the gate-closed position results in the complete lifting of the gate, and return of the leverage handle to the gate-closed position allows the gate to return to its closed position. The extension spring assists in achieving such gate positioning, and maintaining it. Movement of the leverage handle only slightly away from the gate-closed position opens the gate only slightly, which causes an arcing rotation of the second gate attachment arm around the second hinge connection with the second riser mount while the gate stop bracket maintains its gate-closed orientation with its counterbalance end biased outwardly and its catch end traveling along the outer edge of the second riser mount until its tip seats in the closing-catch notch of the outer edge of the second riser mount to thereby chock the gate in a partially-open position. Further movement of the leverage handle away from the gate-closed position further leverages the gate upwardly which causes further arcing rotation of the second gate attachment arm so that the gate stop bracket fulcrumatically connected thereto moves so that the tip of its catch end unseats from the closing-catch notch, and continued movement of the leverage handle causes the outer edge of the second riser mount to leverage the gate stop bracket to fulcrumatically pivot so that its counterbalance end moves inwardly and biases the tip of the catch end outwardly away from seating in the closing-catch notch, so that subsequent movement of the lever handle toward the gate-closed position reverses the arcing rotation of the second gate attachment arm around the second hinge connection of the second riser; this allows the tip of the gate stop bracket to bypass the closing-catch notch while the gate closing-catch assembly returns to its initial gate-closed configuration with the gate stop bracket fulcrumatically pivoted back so that its counterbalance end is biased outwardly and its catch end is again abutting the outer edge of the second riser mount.

The closing-catch assembly further may include an extension spring having one end anchored to a lower portion of the second riser mount, and an opposite end connected to the second gate attachment arm and biasing the closed-catch assembly in a gate-closed position.

The gate pickup bracket further may include an outer edge facing outwardly towards the gate and including an opening-stop notch interfaceable with the lift projection of the attachment arm to stop further opening of the gate.

Besides the apparatus described herein, the invention also includes a method of controlling an apparatus described above, to control the opening and closing of a gate hingedly mounted at the upper margin of a chute mouth of a mower deck. The method may include the steps of:

(a) moving the leverage handle the maximum distance from the gate-closed position to completely lift the gate; and (b) returning the leverage handle to the gate-closed position to return the gate to its closed position.

The method may include the further optional step of moving the leverage handle only slightly away from the gate-closed position to open the gate only slightly until the tip of the catch end of the gate stop bracket seats in the closing-catch notch of the outer edge of the second riser mount to thereby chock the gate in a partially-open position.

The method described herein may include the further optional steps of:

(a) further moving the leverage handle away from the gate-closed position so that the tip of the catch end of the gate stop bracket unseats from the closing-catch notch of the outer edge of the second riser mount; and (b) subsequently moving the lever handle toward the gate-closed position to return the gate closing-catch assembly to its initial gate-closed configuration.

It should be recognized, particularly by those skilled in the art, that differences in the structures described may be adopted, without a material change in the function or operation of the vehicle, or departure from the disclosed invention as described in the accompanying claims.

We claim:

1. An apparatus for controlling opening and closing of a gate hingedly mounted at an upper margin of a portal, said apparatus comprising:
    a gate lifting assembly comprising a hinge pin hingedly connecting, to a riser mount,
        a gate attachment arm having a lift projection, and
        a gate pickup bracket having a depression end and a lifting end on opposite sides of said hinge pin providing a fulcrumatic connection;
    a lift leverage bracket comprising a hinged end hingedly anchored near the portal and having a second end near the depression end of the gate pickup bracket, and further comprising a second end wall defining an aperture for constraining a lift actuating rod carried by said lift leverage bracket, said lift actuating rod comprising a pivotal anchoring end anchored to said lift leverage bracket close to said hinged end and extending through and constrained by said second end wall defining the aperture, and comprising a depressing end affixed to the depression end of the gate pickup bracket; and
    a leverage handle having an anchor end anchored to said lift leverage bracket, and having a handle end to be grasped for actuating the apparatus, whereby movement of the leverage handle from a gate-closed position causes the lift leverage bracket to pivot so that the depressing end of the lift actuating rod depresses the depression end of the gate pickup bracket, which leverages the lifting end upwardly beneath the lift projection of the gate attachment arm, thereby lifting the gate from said gate-closed position to a gate-open position.

2. The apparatus as in claim 1, wherein said depressing end is configured to pivotally connect to the lift leverage bracket.

3. The apparatus as in claim 2, wherein said pivotal connection comprises a ball joint.

4. The apparatus as in claim 1, wherein said pivotal anchoring end of said rod comprises a ball joint.

5. The apparatus as in claim 1, wherein said gate pickup bracket further comprising an outer edge facing outwardly towards the gate and including an opening-stop notch interfaceable with said lift projection of said gate attachment arm to stop further opening of the gate.

6. The apparatus as in claim 1, wherein subsequent movement of the leverage handle back toward the gate-closed position reverses the lift leverage bracket's pivoting depressing of the depression end of the gate pickup bracket, thereby lowering the lifting end beneath the lift projection of the gate attachment arm and thereby allowing the gate to return to the initial gate-closed position.

7. The apparatus as in claim 1, further comprising a gate closing-catch assembly comprising a second hinge pin hingedly connecting:
    a second riser mount having an upper end defining an aperture accepting said second hinge pin, and further having an outer edge facing outwardly towards the gate and including a closing-catch notch; and
    a second gate attachment arm having a gate stop bracket fulcrumatically connected thereto and including a counterbalance end on one side and on an opposite side of said fulcrumatic connection a catch end abutting the outer edge of the second riser mount wherein the catch end further comprises a tip for seating in said closing-catch notch;
    whereas movement of the leverage handle partly away from the gate-closed position opens the gate partially, which causes an arcing rotation of the second gate attachment arm around the second hinge connection with the second riser mount while the gate stop bracket maintains the gate-closed orientation with the counterbalance end biased outwardly and the catch end traveling along the outer edge of the second riser mount until the tip seats in the closing-catch notch of the outer edge of the second riser mount to thereby chock the gate in a partially-open position.

8. The apparatus as in claim 7, wherein said closing-catch assembly further comprises an extension spring having one end anchored to a lower portion of the second riser mount, and an opposite end connected to the second gate attachment arm and biasing the second gate attachment arm in the gate-closed position or the gate-open position or the gate partially-open position.

9. The apparatus as in claim 7, wherein further subsequent movement of the leverage handle away from the gate partially-open position toward the gate-open position moves the tip of the gate stop bracket out of the closing-catch notch, and continued movement of the leverage handle causes the outer edge of the second riser mount to leverage the gate stop bracket to pivot so that the counterbalance end pivots inwardly and biases the tip outwardly away from seating in the closing-catch notch, so that subsequent movement of the leverage handle toward the gate-closed position reverses the arcing rotation of the second gate attachment arm around the second hinge connection of the second riser mount, allowing the tip of the gate stop bracket to bypass the closing-catch notch while the gate closing-catch assembly returns to the initial gate-closed configuration with the gate stop bracket pivoted back so that the counterbalance end is biased outwardly and the catch end is again abutting the outer edge of the second riser mount.

10. An apparatus for controlling opening and closing of a gate hingedly mounted at an upper margin of a chute mouth of a mower deck, said apparatus comprising:
- a gate lifting assembly comprising a hinge pin hingedly connecting, to a riser mount, a gate attachment arm having a lift projection and a gate pickup bracket having a depression end and a lifting end;
- a gate closing-catch assembly comprising a second hinge pin hingedly connecting:
  - a second riser mount having an upper end defining a hole accepting said second hinge pin, and further having an outer edge facing outwardly towards the gate and including a closing-catch notch; and
  - a second gate attachment arm having a gate stop bracket fulcrumatically connected thereto and including a counterbalance end on one side and on an opposite side of said fulcrumatic connection a catch end abutting the outer edge of the second riser mount, wherein the catch end further comprises a tip for seating in said closing-catch notch;
- a lift leverage bracket comprising a hinged end hingedly anchored near the chute mouth and having a second end near the depression end of the gate pickup bracket, and further comprising a second end wall defining an aperture for constraining a lift actuating rod carried by said lift leverage bracket, said lift actuating rod comprising a pivotal anchoring end having a ball joint anchored to said lift leverage bracket close to said hinged end and extending through and constrained by said second end wall defining the aperture, and comprising a depressing end having a ball joint affixed to the depression end of the gate pickup bracket; and
- a leverage handle having an anchor end anchored to said lift leverage bracket, and having a handle end to be grasped for actuating the apparatus, whereby movement of the leverage handle from a gate-closed position causes the lift leverage bracket to pivot so that the lift actuating rod depresses the depression end of the gate pickup bracket, which leverages the lifting end upwardly beneath the lift projection of the gate attachment arm, thereby raising the gate from the gate-closed position to a gate-open position; and
- whereas movement of the leverage handle a maximum distance from the gate-closed position results in the complete lifting of the gate, and return of the leverage handle to the gate-closed position allows the gate to return to the gate-closed position; and
- whereas movement of the leverage handle partly away from the gate-closed position opens the gate partially, which causes an arcing rotation of the second gate attachment arm around the second hinge connection with the second riser mount while the gate stop bracket maintains the gate-closed orientation with the counterbalance end biased outwardly and the catch end traveling along the outer edge of the second riser mount until the tip seats in the closing-catch notch of the outer edge of the second riser mount to thereby chock the gate in a partially-open position; and
- whereas further movement of the leverage handle away from the gate-closed position further leverages the gate upwardly which causes further arcing rotation of the second gate attachment arm so that the gate stop bracket fulcrumatically connected thereto moves so that the tip of the catch end unseats from the closing-catch notch, and continued movement of the leverage handle causes the outer edge of the second riser mount to leverage the gate stop bracket to pivot so that the counterbalance end moves inwardly and biases the tip of the catch end outwardly away from seating in the closing-catch notch, so that subsequent movement of the leverage handle toward the gate-closed position reverses the arcing rotation of the second gate attachment arm around the second hinge connection of the second riser mount, allowing the tip of the gate stop bracket to bypass the closing-catch notch while the gate closing-catch assembly returns to the initial gate-closed configuration with the gate stop bracket pivoted back so that the counterbalance end is biased outwardly and the catch end is again abutting the outer edge of the second riser mount.

11. The apparatus as in claim 10, wherein said closing-catch assembly further comprises an extension spring having one end anchored to a lower portion of the second riser mount, and an opposite end connected to the second gate attachment arm and biasing the closing-catch assembly in the gate-closed position or the gate-open position or the gate partially-open position.

12. The apparatus as in claim 10, wherein said gate pickup bracket further comprising an outer edge facing outwardly towards the gate and including an opening-stop notch interfaceable with said lift projection of said gate attachment arm to stop further opening of the gate.

* * * * *